United States Patent [19]

Kirby

[11] 4,255,921
[45] Mar. 17, 1981

[54] BAT CONSTRUCTION FOR A HARVESTER REEL

[76] Inventor: Donald J. Kirby, Rte. #1, Vincent, Iowa 50594

[21] Appl. No.: 36,502

[22] Filed: May 7, 1979

[51] Int. Cl.$^3$ ............................................. A01D 57/02
[52] U.S. Cl. .................................................... 56/220
[58] Field of Search ................. 56/219, 220, 221, 226, 56/227

[56] References Cited

U.S. PATENT DOCUMENTS

| | | | |
|---|---|---|---|
| 2,457,490 | 12/1948 | Press | 56/220 |
| 3,158,976 | 12/1964 | Scheidenhelm | 56/220 |
| 3,468,109 | 9/1969 | Reimer | 56/220 |
| 3,796,030 | 3/1974 | Neal et al. | 56/220 |
| 3,869,847 | 3/1975 | May | 56/220 |
| 4,068,454 | 1/1978 | Webb | 56/220 |

*Primary Examiner*—Robert A. Hafer
*Attorney, Agent, or Firm*—Morton S. Adler

[57] ABSTRACT

A bat board construction of a harvester reel for use in harvesting soybeans includes an elongated shield of tear drop configuration having its widest dimension at the top and its lower and narrowest portion secured to a substantially rectangular bat board and operatively secured at respective ends to a harvester reel for rotation therewith. The wide end of the shield is several times greater than the narrow end and of sufficient breadth so that as the narrow end enters the crop, the relatively wide top serves to maintain separation of the stems and pods of the plant to prevent their inherent tendency when in contact to cling together and to become wrapped around the bat and reel instead of being drawn into the operating mechanism of the harvester. The shield is of unitary construction or otherwise designed to be planar extending the length of the reel to eliminate open spacings, journals, bearings, washers and the like generally present in convention construction that provide areas where the plants can become wrapped around the bat and reel. Provisions are made to adapt this new construction to conventional unshielded bat boards of the type secured in immediately adjacent depending relationship to a support shaft.

4 Claims, 7 Drawing Figures

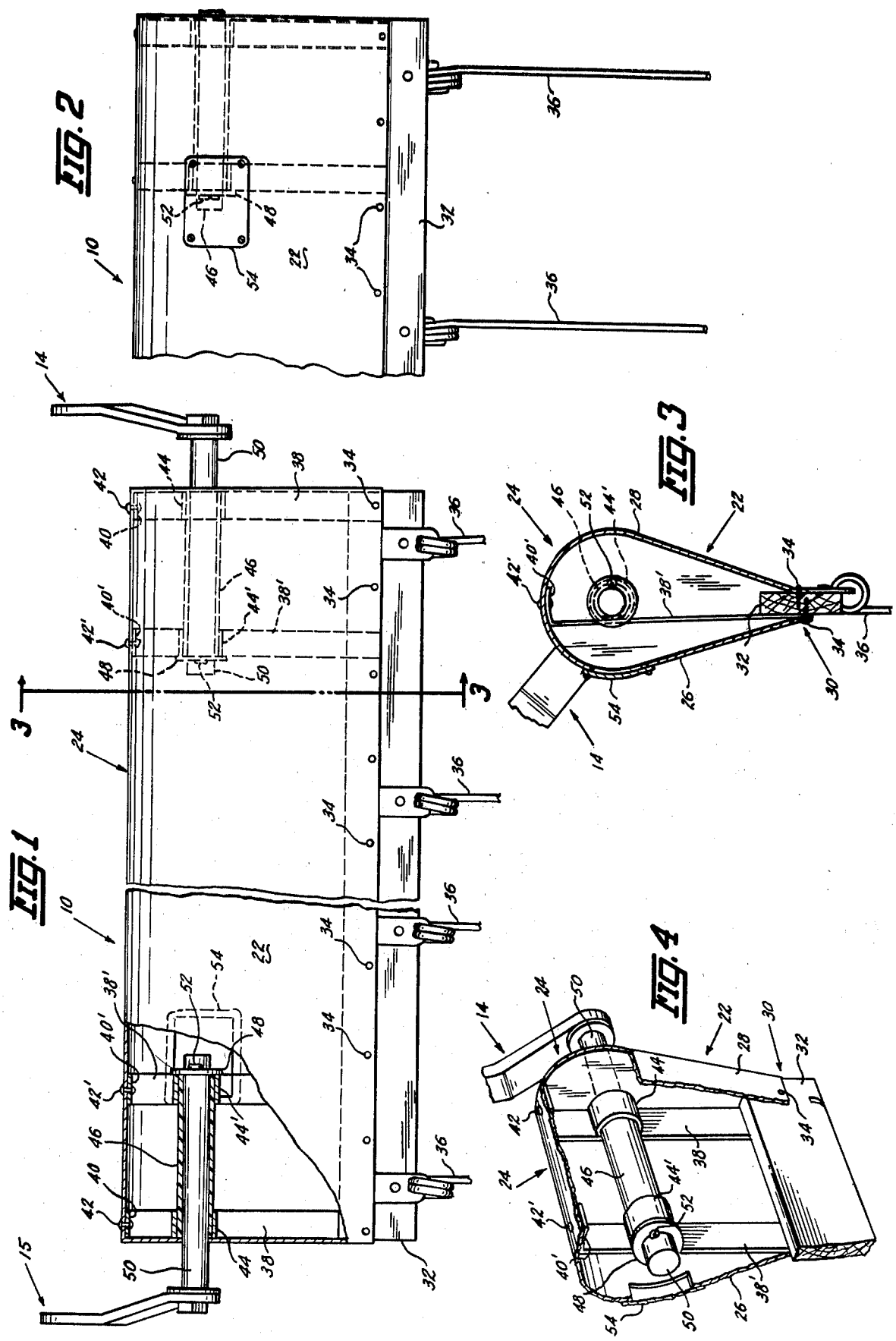

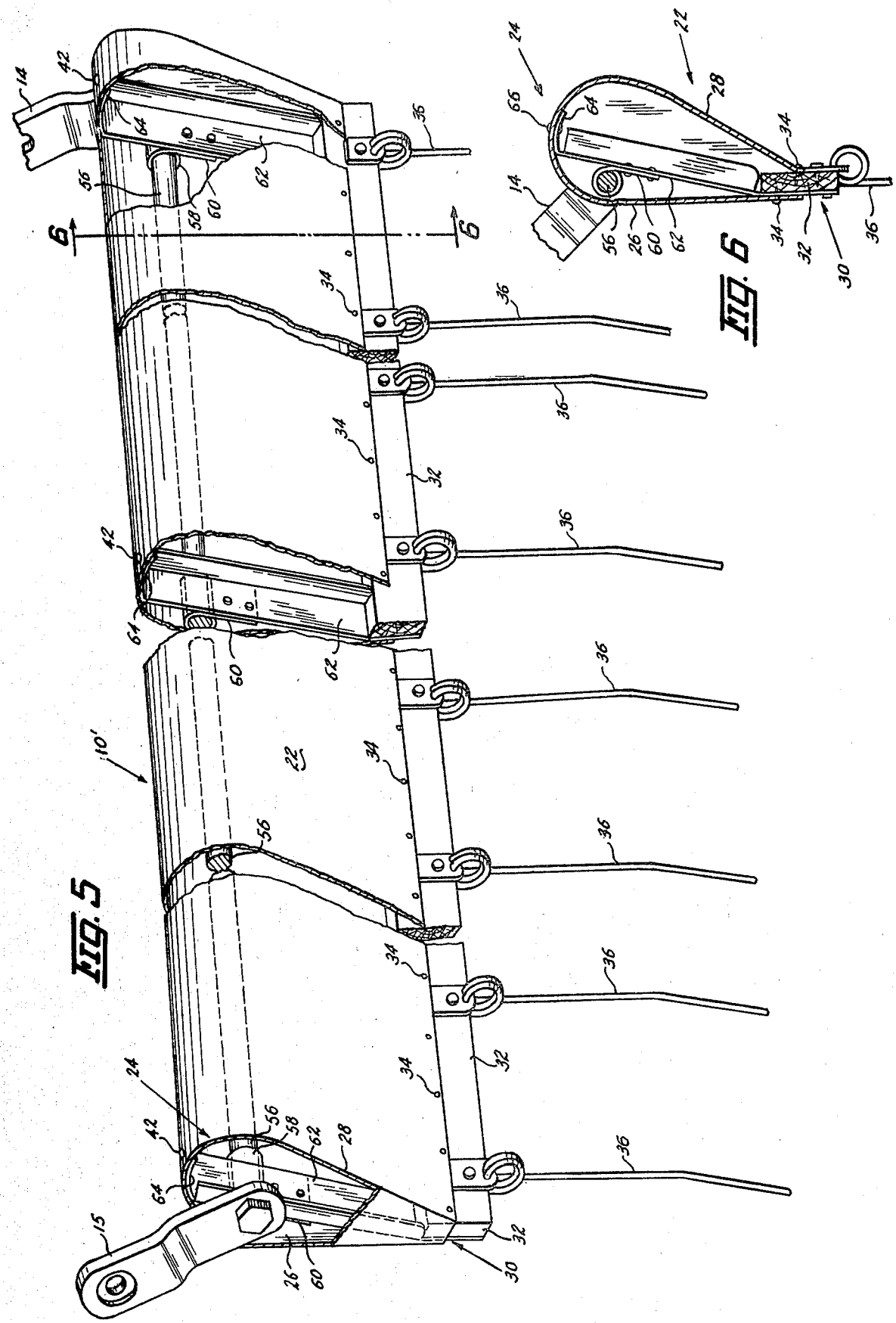

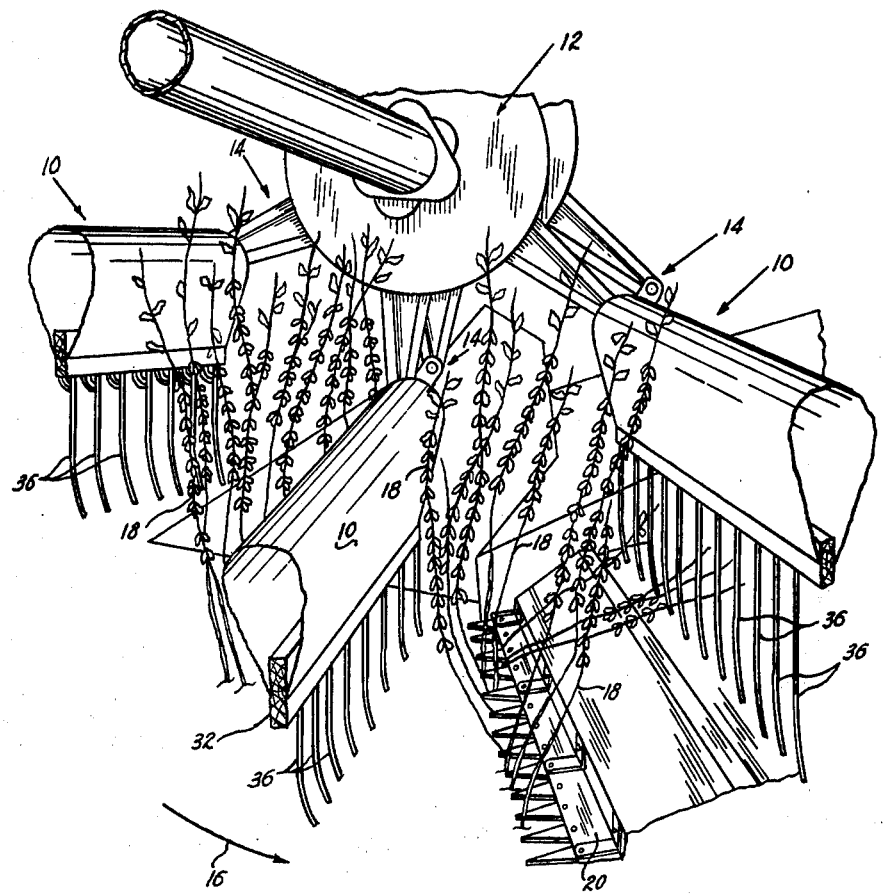

4,255,921

BAT CONSTRUCTION FOR A HARVESTER REEL

BACKGROUND OF THE INVENTION

This invention relates to improvements in bat board construction on harvesters reels of the type used for the harvesting of soybeans.

It is a well known and common practice in the farming industry to use harvester reel bats for the harvesting of soybeans and other crops as exemplified in U.S. Pat. Nos. 3,158,976, 3,796,030, 3,869,847 and others referred to therein. Conventionally, such bats include an elongated support shaft extending the length of the reel and a plurality of generally rectangular bat boards spaced longitudinally thereof and secured thereto in immediate depending relationship. The shafts are supported at respective ends by reel components on the harvester which are rotated by appropriate well known mechanism not material to this invention. The number of bat assemblies including the number of journals, bearings and the like on each shaft carried by the reel may vary with the style and size of the reel. Such bats are used both with and without depending tines but usually include such tines which, as the reel rotates forwardly at the top and rearwardly at the bottom, serve to rake or comb the plants rearwardly into the cutting and conveying mechanism of the harvester.

Harvesting machines of the type here involved may be equipped, as is well known, either with a floating sickle bar which cuts the soybean plant approximately one and one half to two inches from the ground or with a non-floating sickle bar that cuts the plant approximately two and one half to four inches from the ground. The use of the floating sickle bar is the more prevalent of the two and requires a deeper penetration of the bat into the standing plants than with the non-floating bar for efficient harvesting. Thus, the depth of penetration of the bat as commonly practiced is an important factor in the harvesting process of soybeans for the following reasons.

The soybean is a leguminous plant attaining heights in the range of twenty four to forty eight inches with a general average of thirty four inches more or less. The plant has hairy stems branching in all directions with thick trifoliate hairy leaves and a fruit which is a broad two to five seeded pod covered with stiff reddish hairs. By the time the soybeans are ready for harvest, the leaves are gone leaving the narrow hairy stems and the hairy pods and because of these characteristics, the plants have an inherent tendency to cling together when jostled or moved into contact with each other. Consequently, when harvester reel bats of conventional construction and as presently used disturb the plants as the bat makes a penetration thereof, the stems and pods tend to swing back together and form a clinging mass above the bat. In this condition when the sickle bar severs the stems near the ground, at least some of the plants become wrapped around the moving bats and reel instead of being drawn into the machine. When this occurs, and as the harvester proceeds, part of the wrapped plants will remain on the bat and reel and accumulate, part may fall to the ground to be recut by the sickle bar and part may remain on the ground without reaching the machine. Elevation of the sickle bar to possibly avoid the wrapping results in the beans accumulating on the platform of the machine and eventually plugging the machine.

The reason for such accumulations on the bat and reel is because the conventional bat board is relatively narrow on the order of one to one and a quarter inches and, as noted above, is disposed in adjacent depending relationship to a support shaft of corresponding diameter so that the shaft and bat present a relative small and narrow elongated component as it moves into the plants resulting in the wrapping described. The amount of such accumulations of plants on the bat and reel will vary as some accumulations fall off as previously mentioned and as more is added, they will eventually reach a point where they must be removed for efficient harvesting. This is best accomplished by hand and is, of course, an interruption in harvesting and time consuming as well as wasteful of the crop which falls to the ground.

With the above observations in mind, it is one of the important objects of this invention to provide an improved bat construction for a harvester reel used in harvesting soybeans that will, as it penetrates the plant to draw the cut stems into the operating mechanism of the harvester, serve to maintain separation of the plants above the bat to prevent their clinging together and from becoming wrapped about the bat board and reel.

More particularly, it is an object herein to provide a harvester reel bat as characterized which includes a plant spacer member preferably in the form of a bat shield of tear drop configuration having its widest dimension at the top and its narrowest dimension at the bottom.

Another object is to provide a tear drop shaped bat shield of the above class on which the width of the top is several times greater than the width of the bottom and of the diameter of any bat support shaft to which it may be attached whereby the wide top serves to maintain separation of the plants as the bottom of the shield penetrates the plants and thus prevents the plants from becoming wrapped about the shield or reel.

A further object is to provide a bat shield as described that is of unitary construction or otherwise designed to be planar in extending the length of the harvester reel and offers no restricted intermediate areas or surfaces susceptible to facilitating the wrapping of the plant thereabout.

Still a further object of this invention is to provide an improved bat board construction of the above class which provides for more efficient harvesting of soybeans by eliminating crop accumulations, by more efficiently raking and combing the plants at the bottom into the machine instead of pulling them from their upper portion when wrapping occurs and by increasing the total yield obtainable by the harvester due to a lesser amount of the cut crop escaping entry into the machine.

Another object is to provide an improved method of harvesting soybeans.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIg. 1 is a foreshortened rear side elevational view of the bat construction according to this invention including fragmentary portions of opposed ends of a conventional harvester reel to show the mounting of this invention thereto and with portions of the shield of this invention broken away to more clearly illustrate the construction thereof, FIG. 2 is a fragmentary elevational view of one end of the front side showing the access door in the bat shield to the interior bearing, there being a like door on the opposite end, FIG. 3 is a cross sectional view taken on the line 3—3 of FIG. 1, FIG. 4 is a fragmentary perspective view of the right end of the shield as viewed in FIG. 1, broken away to illustrate the bearing support for attachment to the harvester reel, FIG. 5 is a foreshortened perspective view showing a conventional bat support shaft attached to a harvester reel at each end and the bat board therefor adapted as to arrangement in accordance with this invention, the shield of this invention being broken away in parts to more clearly illustrate the structure for the adaptation, FIG. 6 is a cross sectional view taken on the line 6—6 of FIG. 5, and FIG. 7 is a fragmentary perspective view showing the operation of the present invention on a harvester reel and the relationship thereto with the soybean plants in accordance with the objects of this invention as set forth.

DESCRIPTION OF THE PREFERRED EMBODIMENTS

Referring to the drawings, the new bat construction of this invention is designated generally by the numeral 10 as best seen in FIGS. 1 and 7 and designed for use with a conventional and well known harvester reel for the harvesting of soybeans.

For purposes of illustration for the description to follow, a fragmentary portion of one end of a conventional harvester reel machine is shown in FIG. 7 that includes the reel assembly 12 from which spaced radial arms 14 extend and to each of which one end of a respective new bat construction 10 is attached as will appear and it will be understood that the opposite end of the machine is similarly constructed. The number of bat constructions 10 will vary with the size and style of the machine. In operation, as is well known and will be referred to later, the direction of movement of the machine in FIG. 7 is toward the left as viewed with reel assembly 12 revolving forwardly at the top and rearwardly at the bottom indicated by arrow 16 and with bat members 10 maintaining a substantially vertical attitude during rotation of the reel to penetrate the plants and to rake or comb the plants 18 into the sickle bar 20 and then into the machine, all of which is well known in machines of this type.

Referring now more particularly to FIGS. 1-4, this new bat construction 10 includes an elongated unitary shield 22, preferably of sheet metal, with a tear drop configuration in cross section and being sufficient in length to extend substantially between opposed arms 14, 15 of the harvester reel as seen in FIG. 1. The widest dimension of the tear drop shaped shield 22 is defined by the arcuate top end 24 from which the opposed sides 26, 28 depend in converging relationship to the narrow bottom end 30 where sides 26, 28 are secured to a conventional rectangular bat board 32 in any suitable manner such as by nails 34, such board 32 being coextensive in length with shield 22. Depending from board 32 in spaced relationship are a plurality of elongated tine members 36 in accordance with conventional arrangements.

The new bat construction or assemblies 10 are mounted at respective ends to the respective reel arms 14, 15 by like bearing means for which one is described as follows with reference being more particularly to FIGS. 3 and 4.

Interiorly at the end of shield 22, an elongated rigid brace or bracket 38 has an angularly disposed short arm 40 at one end secured to shield 22 at the top end 24 by a rivet or the like 42 so that brace 38 depends therefrom intermediate shield sides 26, 28 to the bottom end 30 where it is secured to the bat board 32 and provides additional support therefor. A similar bracket with the numerals primed is secured interiorly of shield 22 in spaced relationship inwardly of bracket 38 and brackets 38, 38' have respective bearing collars 44, 44' in which is securely mounted the horizontal sleeve 46 having a washer 48 on its inner end as seen in FIGS. 1 and 3. Thus arranged, sleeve 46 is telescopically journalled on the stub shaft 50 suitably secured to a reel arm as shown. The free end of shaft 50 extends slightly beyond washer 48 for receiving a removable cotter pin or the like 52 to maintain the relative position of sleeve 46 on shaft 50. Access to the interior of shield 22 for inserting and removing pin 52 is provided by the door means 54 as shown in FIGS. 1-3.

Referring now to FIGS. 5, 6, I have shown my new bat construction 10 adapted for use on a conventional harvester reel bat support shaft 56 and such adaptation is designated by the numeral 10'. Like parts in construction 10' to those described for construction 10 will be given like numerals.

The conventional harvester reel support shaft 56 extends between arms 14, 15 for mounting in bearing members such as 58 shown on arm 15 in a well known manner. Also, conventionally, a plurality of short depending brackets 60 are carried by shaft 56 to which the bat board 32 is normally secured in immediately adjacent depending relationship and carries the depending tines 36. The standard bat board has a relatively narrow width on the order of one to one and a quarter inches and as can been seen in FIG. 6, the diameter of shaft 56 is approximately the same so that such arrangement which is not normally covered by any shield such as 22, presents a very narrow object moving through the plants which is susceptible to the problem of wrapping mentioned above.

The shield 22, bat board 32, nails 34 and times 36 of construction 10' (FIGS. 5,6) are the same as in construction 10 (FIGS. 1-4) and make it possible to use the present invention with conventional harvester reels having the conventional bat support shaft 56 mounted as shown. This is accomplished by first removing bat 32 from bracket 60 and then attaching to bracket 60 the elongated rigid bracket 62 which is comparable to bracket 38 in construction 10. Bracket 62, in similar form as bracket 38, has the angularly disposed end portion 64 for attachment interiorly of the top end 24 of shield 22 by a rivet or the like 66 and depends therefrom intermediate shield sides 26,28 to the bottom end 30 where it is secured to board 32 by nails 34 as seen in FIG. 6. By this arrangement, board 32 is spaced substantially below shaft 56 as compared to the conventional arrangement and shaft 56 is enclosed by shield 22 which, it is pointed out, at the top, is several times wider than the diameter of such shaft. In practice, I have found it satisfactory to have the widest part of shield 22 at the top portion on the order of four to five inches across but this can, of course, be varied so long as it materially exceeds the diameter of shaft 56 for its intended purpose.

OPERATION

With reference to FIG. 7, the direction of movement of the machine over the crops 18 is to the left as viewed so that reel 12 with the bat assemblies 10, 10' rotate forwardly at the top and rearwardly at the bottom whereby assemblies 10, 10' successively descend into or penetrate the plants 18 with tines 36 first raking and combing such plants into cutting engagement with the sickle bar 20 and then into the machine. The new bat construction 10, 10' with its relatively wide top and overall smooth and planar surfaces serves to maintain separation of the plants 18 as they are penetrated so that as the plants are cut, the tines 36 can rake them from their bottom cut ends into the machine. This is a decided improvement over presently used conventional reel bats since such reels comprising simply a narrow shaft and attached bat, and at times a narrow shield as in the patents referred to earlier, do not sufficiently keep the plants separated enough to avoid their inherent tendency to cling together above the bat and thus, to varying degrees, becoming wrapped around the bat and reel. As a result of such wrappings, the cut plants, being wrapped at their upper portion on the bat, are pulled at their upper areas towards the machine and those portions of the crop which remain on the bat do not reach the machine. Eventually, as described previously, the machine must be stopped to remove the wrappings with portions of the crop in the meantime having fallen to the ground. It will thus be appreciated that with my new bat construction 10, 10', maintaining the separation of the plants 18 during penetration of the bats to avoid the wrapping problem permits the more efficient operation of the raking function of the tines 36 with a resulting more efficient harvesting and more complete yield in addition to eliminating work stoppages to free the wrapped plants. Accordingly, in view of the foregoing, it is thought a full understanding of the construction and operation of this invention will be had and the advantages of the same will be appreciated.

I claim:

1. A bat construction for a soybean plant harvesting machine, said machine having the usual laterally spaced rotating reel arms,
   an elongated plant separating hollow spacer shield defining a relatively wide bulbous top end with opposed depending and converging sides terminating in relatively closely spaced relationship at a bottom end,
   said shield being of unitary construction substantially co-extensive in length with the distance between said reel arms,
   respective shield support assemblies disposed at predetermined points inwardly from the respective ends of said shield,
   each shield support assembly comprising:
     an elongated bracket having a top end and a bottom end and disposed interiorly of said shield,
     means securing the top end of said bracket to the interior of the top end of said shield,
     means securing the bottom end of said bracket to the interior of the bottom end of said shield,
     a bearing collar carried by said bracket and disposed axially of the bulbous end of said shield,
     a sleeve secured in said collar and extending axially of said bulbous end to the adjacent end of said shield,
     a stub shaft removably mounted in said sleeve and operably connected to a respective reel arm,
   a bat board coextensive with the length of said shield secured to the bottom end of said shield and to the bottom end of said brackets, and
   said shield swingable on said stub shafts during rotation of said reel arms so that said bat board is moved downwardly in a substantially vertical attitude to penetrate the plants with the bulbous end of said shield acting to keep such plants separated during the penetration thereof to prevent them from clinging together and from wrapping around said bat board so that when said plants are cut, they are free of entanglement with said bat board and can be effectively moved thereby into the harvesting machine.

2. A bat construction as defined in claim 1 including a respective closure member on said shield relative to each shield supporting assembly for providing access to said removably mounted stub shafts.

3. A bat construction for a soybean plant harvesting machine, said machine having the usual laterally spaced rotating reel arms,
   an elongated plant separating hollow spacer shield defining a relatively wide bulbous top end with opposed depending and converging sides terminating in relatively closely spaced relationship at a bottom end,
   said shield being of unitary construction substantially co-extensive in length with the distance between said reel arms,
   respective first and second shield support assemblies disposed at predetermined points inwardly from the respective ends of said shield and a third like shield support assembly disposed intermediate said first and second shield support assemblies,
   each shield support assembly comprising:
     an elongated bracket having a top end and a bottom end and disposed interiorly of said shield,
     means securing the top end of said bracket to the interior of the top end of said shield,
     means securing the bottom end of said bracket to the interior of the bottom end of said shield,
     a bearing collar carried by said bracket and disposed within the bulbous end of said shield in spaced relationship thereto,
     a support shaft journalled through said collars and operably connected at respective ends to said respective reel arms for movement therewith,
   a bat board coextensive with the length of said shield secured to the bottom end of said shield and to the bottom end of said brackets, and
   said shield swingable on said support shaft during rotation of said reel arms so that said bat board is moved downwardly in a substantially vertical attitude to penetrate the plant with the bulbous end of said shield acting to keep such plants separated during the penetration thereof to prevent them from clinging together and from wrapping around said bat board so that when said plants are cut, they are free of entanglement with said bat board and can be effectively moved thereby into the harvesting machine.

4. A bat construction as defined in claims 1 or 3 including a
   plurality of spaced tines arranged in depending relationship on said bat board.

* * * * *